No. 693,208. Patented Feb. 11, 1902.
F. H. ARMSTRONG.
TYPE WRITER.
(Application filed Nov. 25, 1901.)

(No Model.) 6 Sheets—Sheet 1.

Fig. I.

WITNESSES
INVENTOR
Frank H. Armstrong
BY
Geo. H. Evans
Attorney

No. 693,208. Patented Feb. 11, 1902.
F. H. ARMSTRONG.
TYPE WRITER.
(Application filed Nov. 25, 1901.)
(No Model.) 6 Sheets—Sheet 2.

No. 693,208. Patented Feb. 11, 1902.
F. H. ARMSTRONG.
TYPE WRITER.
(Application filed Nov. 25, 1901.)
(No Model.) 6 Sheets—Sheet 4.

Witnesses
Fenton S. Belt.
G. Harold Walmsley

Inventor
Frank H. Armstrong
By Geo. W. Evans
Attorney

No. 693,208. Patented Feb. 11, 1902.
F. H. ARMSTRONG.
TYPE WRITER.
(Application filed Nov. 25, 1901.)
(No Model.) 6 Sheets—Sheet 6.

Witnesses
Inventor
Frank H. Armstrong
By Geo. H. Evans
Attorney

UNITED STATES PATENT OFFICE.

FRANK H. ARMSTRONG, OF AUBURN, NEW YORK.

TYPE-WRITER.

SPECIFICATION forming part of Letters Patent No. 693,208, dated February 11, 1902.

Application filed November 25, 1901. Serial No. 83,648. (No model.)

*To all whom it may concern:*

Be it known that I, FRANK H. ARMSTRONG, a citizen of the United States, residing at Auburn, in the county of Cayuga and State of New York, have invented certain new and useful Improvements in Type-Writers, of which the following is a specification.

My invention relates to type-writers of the character shown in my Patent No. 654,217, dated July 24, 1900.

The objects of the invention are, first, to improve the construction of the location arm or plate by providing it with a number of transversely-disposed slots, one for every location-pin, instead of the two longitudinally-disposed curved slots of the patent, to form this location arm or plate separate from the type wheel or segment to which it is geared, to improve the key-lever mechanism and the connections between the same and the type-wheel carrier, and to provide a novel and efficient mechanism for raising and lowering the type-wheel to bring its several series of characters into the proper plane for printing the upper or lower case letters or the characters or signs therebetween. These objects, together with others hereinafter set forth, I accomplish by the mechanism shown in the accompanying drawings, in which—

A designates the bed or frame of the machine, preferably of open rectangular form and provided between its ends with a horizontal fulcrum-bar $A'$, having a slot $a$ for every key-lever B. The rear ends of the key-levers extend into slots formed in the vertical location-pins C, which pins are all on a common line extending from side to side of the machine and at their upper and lower ends pass through apertures in two transverse bars forming portions of the frame at the rear thereof. Thus as the front ends of the key-levers B are depressed their rear ends will raise the respective location-pins C. The key-levers B are returned to their normal positions by spring rods or wires $b$, extending from a transverse angle bar $A^2$, near the front of the machine, rearwardly to links $b^2$, depending from the key-levers in rear of their fulcrum-points. In order that these spring rods or wires may be readily inserted and removed, their front ends are bent downwardly and after having been passed through transverse apertures $a^2$ in the vertical flange of the angle-bar $A^2$ are then inserted in the vertical apertures formed in the horizontal member of said angle-bar, the strain on the free rear ends of the spring-rods serving to retain their front ends in proper position. $B'$ is a transverse retaining rod or bar crossing the key-levers B above their fulcrum-points and serving to prevent accidental displacement thereof.

Every key-lever B is provided in rear of its fulcrum with a downwardly and rearwardly projecting arm $b^3$, provided with an inclined slot $b^4$, which receives a lateral pin $d$, projecting from every one of a series of vertically-swinging levers D, pivoted at their lower ends on a transverse rod $d'$, extending from side to side of the frame. These levers D are in practice provided with arms $d^2$, on which said pins are mounted or formed. It follows, therefore, that whenever a key is struck the rear end of the lever will rise and carry a pin C up with it, and a lever D will be swung rearwardly, and on release of the key the springs $b$ will return the parts quickly to their normal positions.

Figure 8:
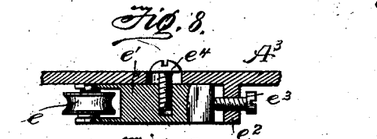
Figs. 8 and 9 are detail views of carriage, guiding-rollers, and slides.
Figure 9:
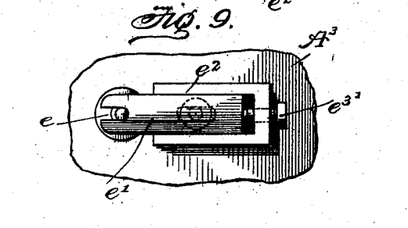
Figure 10:
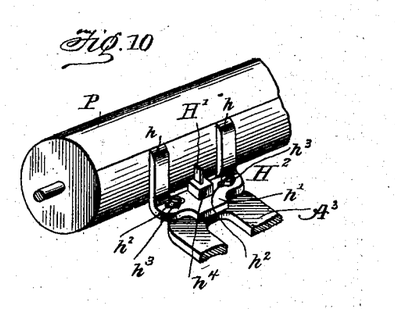
Fig. 10 is a detail perspective of the line-gage and the type-wheel-centering lug and a portion of the platen.
Figure 11:
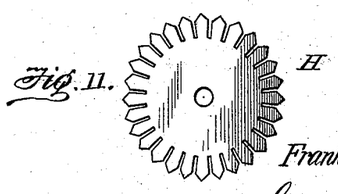
Fig. 11 is a plan of the notched centering or locking disk.
Figures 12, 13:
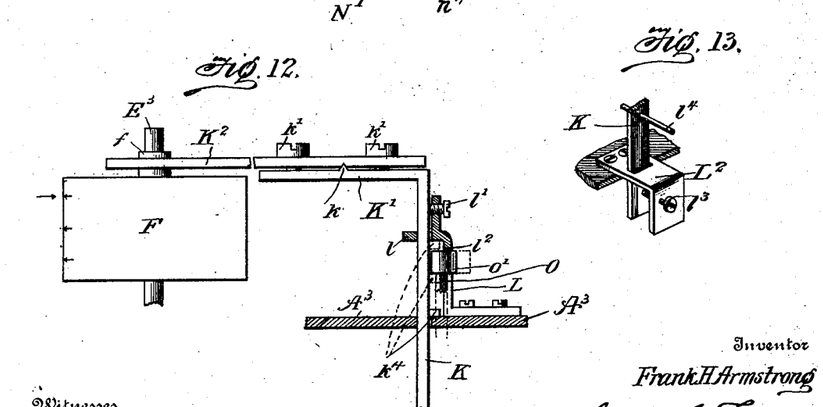
Fig. 12 is an enlarged side elevation, partly in section, of the type-wheel-elevating mechanism.
Fig. 13 is a detail view.

E designates a longitudinally-reciprocating type-wheel carriage, preferably formed of a longitudinal rod $E'$ and a cross-bar $E^2$, rigid therewith, and said cross-bar lies directly in rear of the upper ends of the levers D, so as to be moved rearwardly by any one of said levers upon the depression of the corresponding key-lever. The longitudinal rod E' is mounted to reciprocate between four grooved antifriction-rollers $e$, carried by the four slides $e'$, mounted in oblique guideways $e^2$, formed or secured upon the under side of a horizontal plate $A^3$, forming a rigid part of the frame A, to which it is connected by being screwed to four posts $a^4$, rising from the sides of the main frame. These slides are adjusted in the guideways by the adjusting-screws $e^3$ and are held in their adjusted positions by means of the set-screws $e^4$, which pass down through slots in the plate $A^3$. (See Figs. 8 and 9.) Thus the carriage may be held to reciprocate on a straight line and wear be taken up from time to time. The type-wheel carriage E is retracted by a spring $e^5$, extending from a depending lug $e^6$ on the carriage to a tension-screw $e^7$, mounted in a depending ear or lug $a^5$ at the front end of the frame-plate $A^3$. The ends of the cross-bar $E^2$ are provided with rollers $e^{10}$, which bear firmly against the under side of the frame-plate $A^3$ and prevent the carriage from tilting or rocking. The rear end of the carriage E is provided with a vertical post $E^3$, on which the type-wheel F has both rotary and vertically sliding movement. This type-wheel F is provided with three annular series of letters or characters, the upper series being the letters of the lower case, the next series the figures and signs, and the lowermost series being the upper case or capitals. The type-wheel F is provided beyond its axis with a vertical opening, into which extends a vertical arm $g$ on the rotary hub or sleeve G, mounted to rotate on the carriage-post $E^3$. This hub below its arm $g$ is provided with the peripherally-notched centering-disk H and below this with an operating-gear $g'$ and finally with a spacing-washer or wear-plate $g^2$. The upper end of the type-wheel is provided with a concentric lifting-hub $f$, having an annular groove $f'$, to be hereinafter referred to.

J designates the horizontally-swinging location-plate overlying the frame-plate $A^3$ and pivoted at its front end to the stud $e^8$, rising from the front end of the carriage E, so as to be moved back and forth with the carriage. The rear edge of this location arm or plate is held down by the two arms $j^8$ and is provided with gear-teeth $j$, which mesh with the operating-gear $g'$. The location-plate J receives its horizontally oscillating or swinging movement by means of a series of angular slots $j'$, disposed in the direction of the length of the plate and overlying the location-pins C, there being a slot $j'$ for every pin. The slots at opposite sides of the center of the carriage and location-plate incline in opposite directions, so that the pins and slots at one side will cause the location-plate J to swing to the left when moved rearwardly by the carriage E, and those at the other side will cause the location-plate to swing in the opposite direction. It will be seen, of course, that when a key-lever is depressed it raises its pin C and projects it through the proper slot $j'$, whereupon as the carriage E is moved rearwardly by the further movement of the key-lever the location-plate J will move with it, and in so moving to the rear the inclined wall of the slot $j'$ will cause the plate J to swing and rotate the type-wheel F through its gear $g'$ and arm $g$. The angularity of the slots $j'$ decreases gradually toward the outmost slots, where it is scarcely perceptible, though sufficient to impart the slight movement necessary. The rear ends only of the slots $j'$ are inclined, as the ends next to the operator must be parallel, since the location-plate after it has rotated the type-wheel must move forward on a right line with the carriage and said wheel. When the type-wheel is moved to its printing position, its centering-disk H will engage the centering-lug H' on the frame in the usual manner, and so when the parts are returned to their normal positions the location-plate J will be centered by the lug $K^5$ and the notch $j^3$. The location plate or arm J is supported in rear of its axis $e^8$ upon two antifriction-wheels $e''$, carried by the carriage E and projecting up through the frame-plate $A^3$, these wheels $e''$ being on the arc of a circle struck from the axis $e^8$.

I will now describe the mechanism for raising the type-wheel to bring its different series of letters or characters into the proper plane for printing.

K is a vertically-movable angular slide mounted in suitable bearings in the frame and extending up through a loop $l$ on the upper end of a bracket L, secured on the upper side of the frame-plate $A^3$ and there provided with a rearwardly-projecting arm K', provided on its upper side with a transverse rib $k$ and screw-holes at opposite sides thereof. On the arm K' is secured by screws $k'$ the forked arm or horizontal member $K^2$ of the angular slide K, the forked end $k^3$ of said arm $K^2$ entering the groove $f'$ in the hub $f$ of the type-wheel F and suspending it thereon, so that as the slide K is raised and lowered the type-wheel will be moved vertically therewith, the slot in the fork allowing the type-wheel to be moved into and out of its printing position by the key-levers, as heretofore described. By adjusting the screws $k'$ the type-wheel F may be adjusted so that its type will print full face and not print heavier at the top than at the bottom of the letters, the rib $k$ serving as a fulcrum on which the forked arm $K^2$ rests. The upper end of the bracket L is provided with a screw $l'$, which bears against the slide K to take up lost motion, and below the loop $l$ the bracket L is provided with a notch $l^2$, to be presently described. The vertical slide is provided on its front side in rear of the bracket with a short lug or projection $k^4$. The lower end of the slide K passes through a second bracket $L^2$, having a take-up screw $l^3$.

Figure 1:
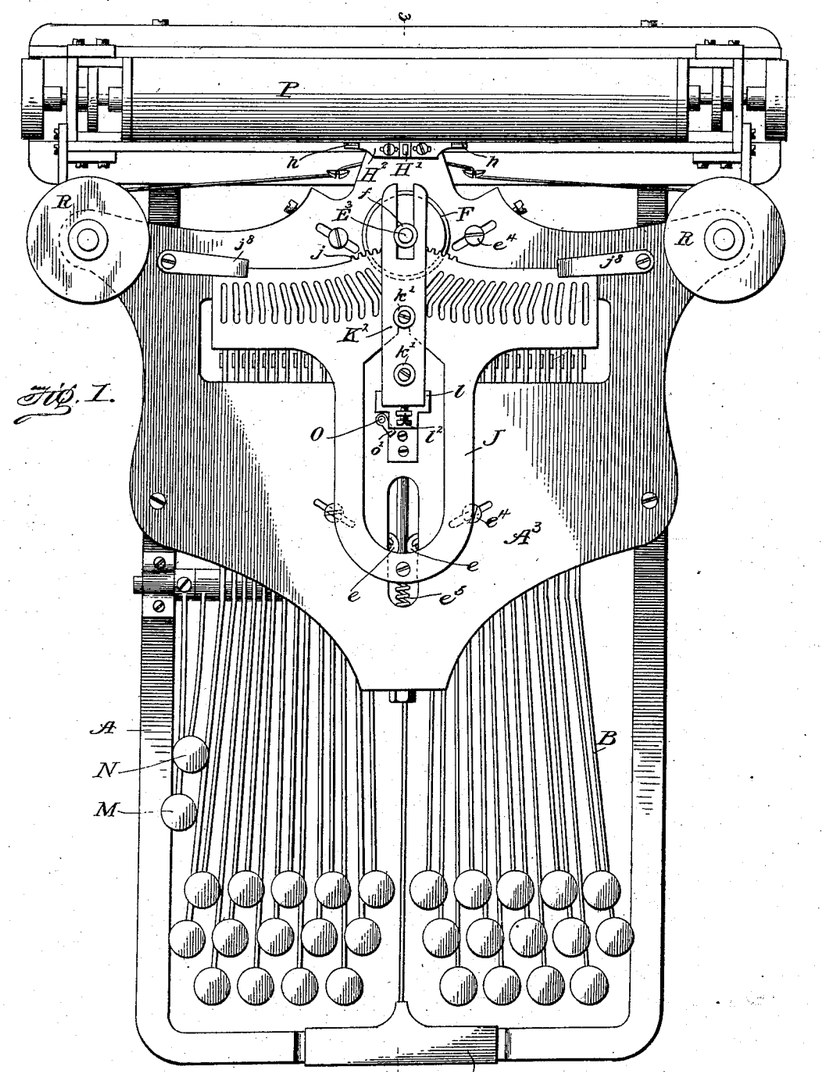
Figure 1 is a plan of the machine with my improvements applied.
Figure 2:
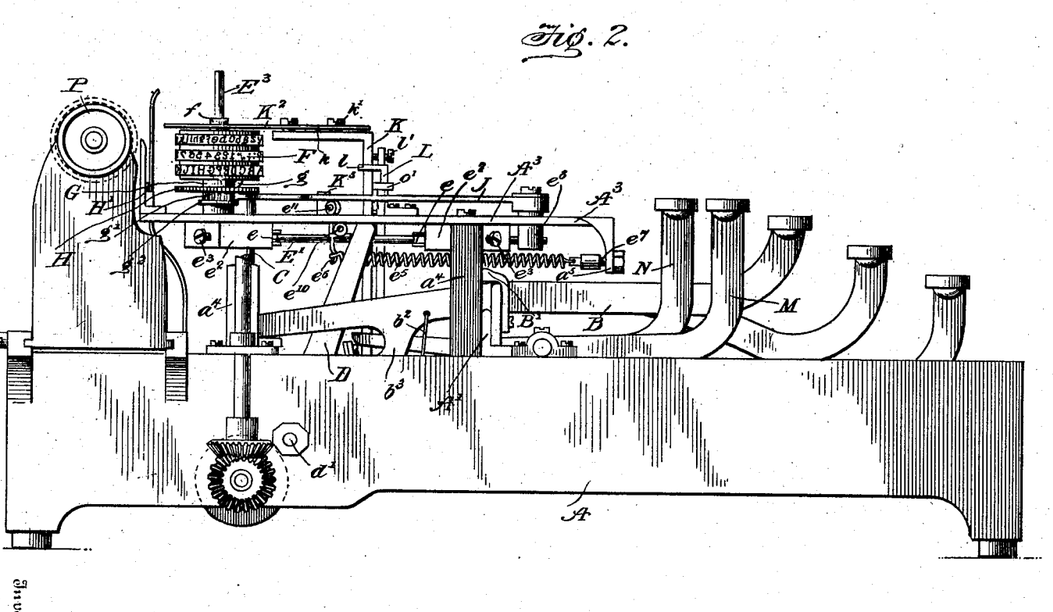
Fig. 2 is a side elevation thereof.
Figure 3:
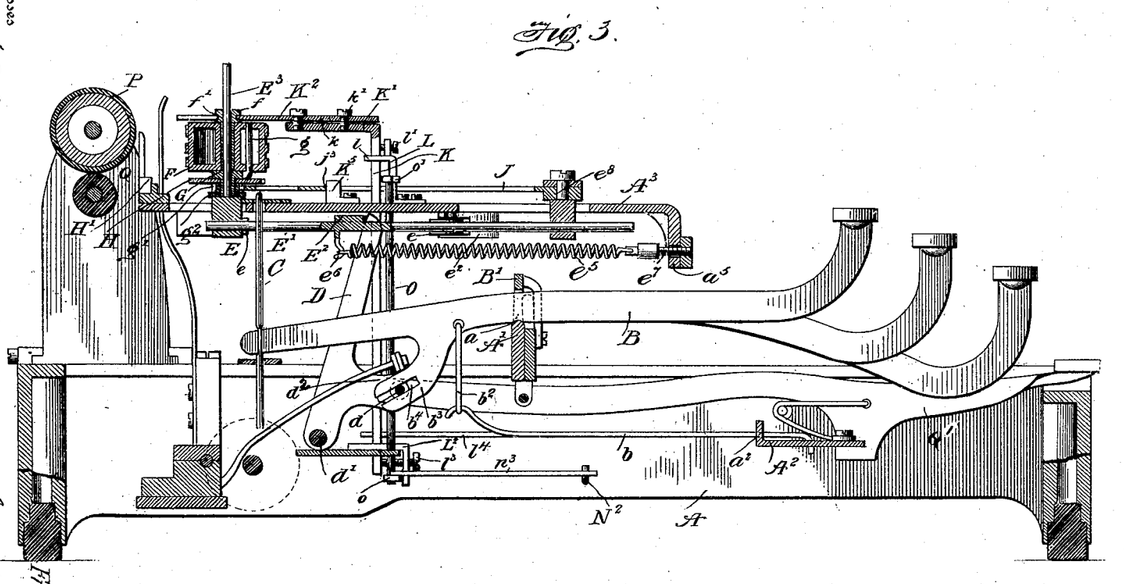
Fig. 3 is a transverse vertical section on the line 3 3 of Fig. 1.
Figure 4:
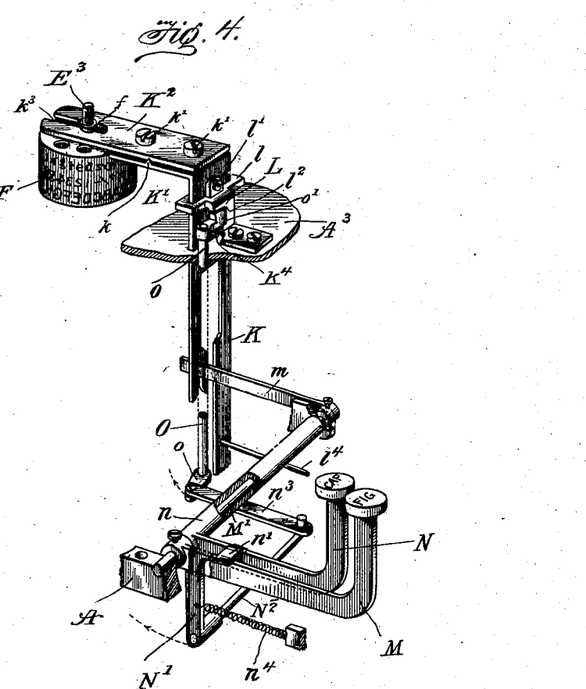
Fig. 4 is a detail perspective of the mechanism for raising the type-wheel into its different printing planes.
Figure 5:
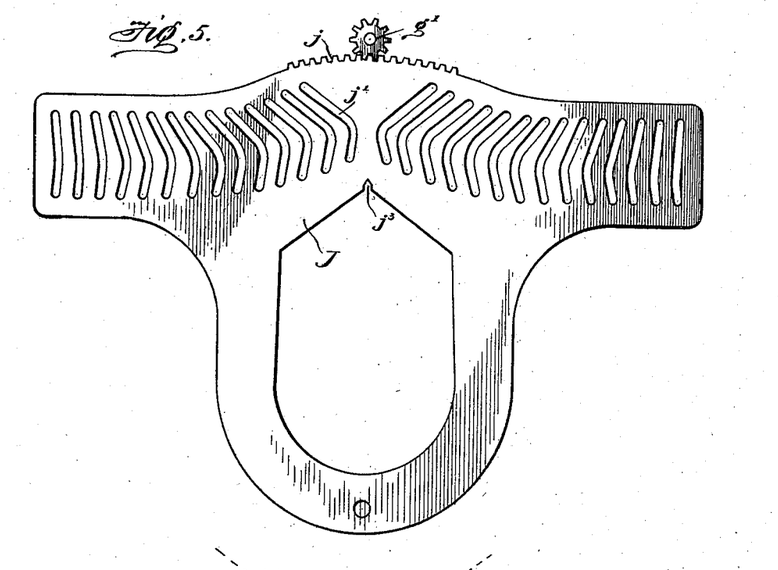
Fig. 5 is a plan of the location plate or arm.
Figure 6:
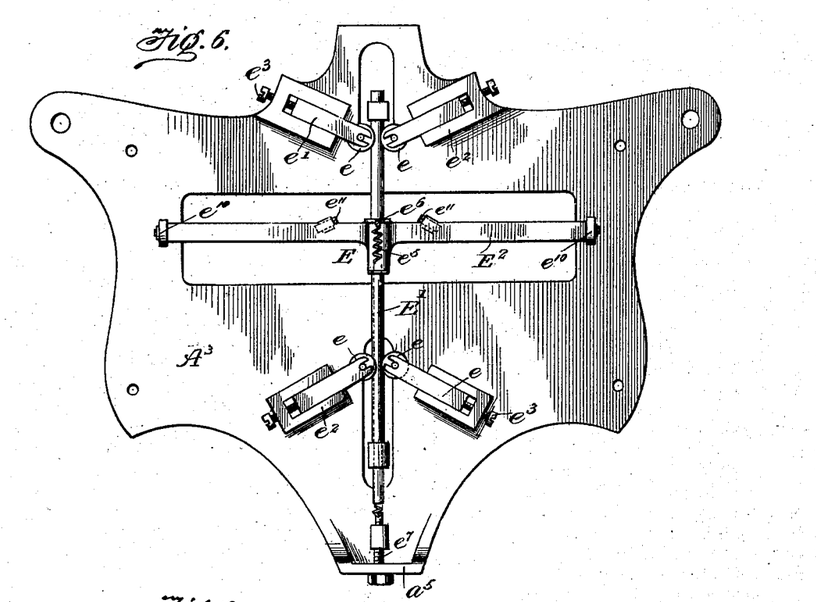
Fig. 6 is an inverted plan of the carriage and the overlying frame-plate.
Figure 7:
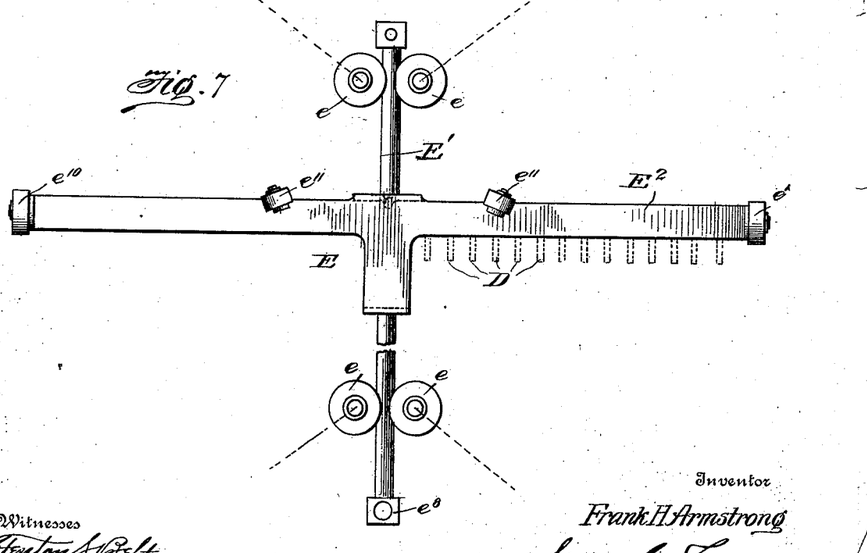
Fig. 7 is a detail plan of the carriage.

M designates the figure or sign key-lever at the left of the machine, and M' is its transverse rock-shaft, mounted in suitable bearings in the frame A and provided at its inner end with a rearwardly-extending arm or crank *m*, which engages the lower slotted end of the slide K, as shown in Fig. 4, to raise the slide against the action of its spring $l^4$, and with it the type-wheel F.

N designates the cap-lever, having its hub *n* turning freely on the rock-shaft M' and provided with a laterally-projecting finger *n'*, overlying the key-lever M. Depending from the lever N is an angle-arm N', to the inner end of the horizontal member $N^2$ of which is connected, by a link $n^3$, the lower cranked end *o* of a vertical rock-shaft O, extending up through the frame-plate $A^3$ and provided with a laterally-projecting latch-arm *o'*. These parts are returned to normal position by a spring $n^4$. The latch-arm *o'* projects through the notch $l^2$ in the bracket L into the vertical path of the lug or projection $k^4$ on slide K. It will be seen, therefore, that when the key-lever M is depressed it will raise the slide K till its lug $k^4$ strikes the latch-arm *o'*, which will bring the type-wheel into position for printing from the middle series of type or characters. Should the key-lever N be depressed, however, it will first rotate shaft O and withdraw latch-arm *o'* out of the path of lug $k^4$, and then the finger *n'* will bear down on and operate key-lever M, which will raise the slide K far enough to bring the lowermost series of type into the printing-plane, where they may be held, if desired, by holding the key-lever M depressed and releasing key-lever N till the latch-arm *o'* swings under the lug or projection $k^4$, where it may remain so long as capitals are to be printed.

R designates any form of ribbon mechanism, and P designates a roller-platen mounted on a paper-carriage Q, of which Q' is the escapement-lever. These inking and carriage mechanisms are not further described herein, since they are not specifically claimed.

The term "type-wheel" is used as a convenient means of including a suitable form of printing segment or wheel however the printing characters are formed, and so the term "location-plate" is used as a broad term regardless of whether this element is a simple plate or a framework or composite structure.

In order that operator may bring the lines on ruled sheets into register with the printing-plane, I have provided what may be called a "line-gage" $H^2$, formed like a yoke, with its two arms *h h* extending up from a base *h'*, provided with slots $h^2 h^2$, through which the screws $h^3 h^3$ pass into the frame-plate $A^3$. The upper edges of these arms are straight and are on a line forming the base of the printing-plane. In practice the base *h'* is cast or otherwise provided with a central boss $h^4$, having a split into which is driven the beforementioned type-wheel centering or locking lug H', formed of a hardened-steel blade. By adjusting the base *h'* the lug H' may be brought into the exact position required. The arms *h h* curve rearwardly at their upper ends toward the platen P, and by placing a pencil-point on the upper edge of an arm *h* and against the sheet of paper lines may be ruled by sliding the paper-carriage back and forth or by rotating the platen according to whether horizontal or vertical lines are desired.

What I claim is—

1. The combination with the location-pins and the key-levers operatively connected therewith, of a longitudinally-movable carriage actuated from the key-levers, a type-wheel mounted on the carriage, and a horizontally-movable location plate or arm also mounted on said carriage operatively connected to the type-wheel and provided with a series of inclined slots one in the vertical path of every location-pin.

2. The combination with the location-pins and the key-levers operatively connected therewith, of a longitudinally-movable carriage actuated from said key-levers, a type-wheel mounted on the carriage, and a horizontally-vibrating location-plate pivoted to the carriage, operatively connected to the type-wheel and provided with a series of angular slots one for every location-pin.

3. The combination with the location-pins and the key-levers operatively connected therewith, of a longitudinally-movable carriage actuated from said key-levers, a type-wheel mounted on the carriage, centering or locking devices for the type-wheel when in its printing position, and a horizontally-movable location plate or arm mounted on the carriage, operatively connected to the type-wheel and provided with a series of angular slots one for every location-pin and in the vertical path thereof.

4. The combination, with the transverse row of vertical location-pins, the key-levers operatively connected at their rear ends with said pins and provided with depending slotted arms, and a series of vertically-swinging carriage-operating levers provided with arms having pins or lugs engaging the slots in the key-levers, of a longitudinally-movable carriage having a cross-bar in the path of all of said carriage-operating levers, a type-wheel mounted on the carriage, and a location-plate also mounted on the carriage, connected with the type-wheel and provided with slots in vertical alinement with the location-pins.

5. The combination with the reciprocating type-wheel carriage having a cross-bar, of a series of key-levers having depending arms provided in their rearwardly-projecting ends with inclined slots, and a series of rearwardly-swinging levers pivoted at their lower ends, bearing at their upper portions against the said cross-bar and provided therebelow with lateral pins entering said inclined slots.

6. The combination with the transverse row of vertical location-pins, and the key-levers operatively connected therewith, of a longitudinally-reciprocating carriage actuated from the key-levers, a type-wheel mounted on the carriage, a location arm or plate provided with a series of individual angular slots for the location-pins and geared to the type-wheel, means for locking or centering the type-wheel when in its printing position and means for centering the location-plate in its return to its normal position.

7. The combination with the key-levers, of an L-shaped cross-bar provided with horizontal and vertical apertures in its vertical and horizontal members respectively, and springs extending through the horizontal apertures and operatively connected therebeyond to the respective key-levers beyond their fulcrum-points and the front ends of the springs being bent down and entering said vertical apertures.

8. The combination with the location-pins and the key-levers for operating them, of a longitudinally-reciprocating carriage actuated from said key-levers and having a cross-bar provided with antifriction-wheels, bearing upon an overlying portion of the machine-frame, a type-wheel mounted on the carriage, a horizontally-oscillating location plate or arm pivoted to the carriage geared to the type-wheel and provided with a series of individual angular slots for the location-pins, and antifriction wheels or rollers on the carriage upon which said location-plate rests.

9. The combination with the transverse line of vertical location-pins and their operating key-levers, of a longitudinally-reciprocating carriage actuated from said key-levers, a horizontally-oscillating location-plate pivoted at its front end to the carriage, geared at its rear end to the type-wheel and provided near its rear end with a series of longitudinally-disposed angular slots one for every location-pin; the slots inclining in opposite directions from the middle of the plate or arm and also decreasing in angularity therefrom.

10. The combination with the reciprocating carriage, the rotary and vertically-movable type-wheel thereon having annular series of characters or signs, the key-levers and intermediate connections between the key-levers and the type-wheel and carriage for reciprocating the carriage and rotating the type-wheel to bring its characters to the printing-point, of means for elevating the type-wheel to bring the desired series up to the printing-plane, including a vertically-reciprocating slide having an arm overhanging the type-wheel and in sliding connection therewith and an auxiliary key-lever operatively connected with the lower end of the slide.

11. In a type-writer of the character described, the combination with the rotary type-wheel, having annular series of characters and mechanism for rotating and propelling the wheel into printing position, of mechanism for elevating the type-wheel comprising a vertical key-actuated slide having an arm overhanging the type-wheel and in sliding connection therewith, a lug on the vertical slide, a stop or latch device movable into and out of the path of the said lug to regulate the height to which the slide may move and means for actuating said stop or latch device.

12. In a type-writer of the class described, the combination with the rotary type-wheel having annular series of characters and mechanism for rotating and propelling the wheel into printing position, of mechanism for elevating the type-wheel comprising a vertical slide operatively connected with the type-wheel and provided with an operating key-lever and a lug or projection, a second key-lever adapted to depress the first key-lever, a vertical rock-shaft operatively connected with the second key-lever and having a lateral latch-arm at its upper end in the path of the lug on the slide; whereby the depression of the first lever will raise the slide till its lug strikes the latch to bring the middle series of characters into the printing-plane and the depression of said second lever will throw the latch away from the lug and further depress the first lever and thereby raise the slide and type-wheel to bring the lowest series of characters into the printing-plane where it may be held by allowing the latch-arm to snap under the lug on the slide.

13. In a type-writer of the class described, the combination with the rotary type-wheel having annular series of characters and mechanism for rotating and propelling the type-wheel into printing position, a vertical slide operatively connected with the type-wheel and provided with an operating key-lever, and a lug or projection, a notched guide-bracket for the slide, a second key-lever having a lateral finger overlying the first-named key-lever, and a vertical rock-shaft operatively connected with the said second key-lever and provided at its upper end with a lateral latch-arm projecting through the bracket-slot into the path of the lug on the vertical slide for the purpose set forth.

14. In a type-writer of the class described the combination with the type-wheel and the vertically-reciprocating slide connected therewith for raising it and provided with a lug or projection and a key-lever for operating the slide, of a notched bracket in which the slide is guided, a screw passed through the bracket to take up lost motion of the slide, a second key-lever having a projection overlying the first-named key-lever, and a vertical rock-shaft actuated from said second key-lever, and provided at its upper end with a lateral latch-arm projecting through the bracket-notch into the path of the lug or projection on the slide.

15. In a type-writer, the combination with the type-wheel having an annularly-grooved hub on its upper end and a key-operated slide provided with a horizontal sectional adjustable arm on its upper end, the upper member of said arm having a forked end entering the said annular groove, two screws securing the two members of the arm together and a transverse rib or projection between the meeting faces of said two sections intermediate of said two screws; whereby the type-wheel may be adjusted to make its characters print full and even.

16. The combination with the reciprocating carriage provided with a vertical spindle, a type-wheel loose on the spindle, and provided with an operating-gear, a series of vertical location-pins, a slotted location-arm mounted on the carriage and having teeth meshing with said operating-gear to rotate the type-wheel, and a series of key-levers operatively connected with the carriage and location-pins, of a vertically-movable slide extending up through bearings in the frame and through an opening in the location-arm and provided at its upper end with a horizontal arm in sliding connection with the type-wheel and a key-lever for actuating the slide to raise the type-wheel.

17. The combination with the reciprocating carriage provided with a vertical spindle, a type-wheel mounted loosely thereon, a rotary hub provided with an operating-gear and a vertical arm in sliding connection with the type-wheel, a series of vertical location-pins, a slotted location-arm mounted on the carriage and having teeth meshing with said operating-gear, and a series of key-levers operatively connected with the said location-pins and carriage, of auxiliary key-levers, a slide actuated from key-lever and connected with the type-wheel for elevating it and a latch mechanism connected with the other key-lever for regulating the movement of the said slide.

18. The combination with the type-wheel carriage and key-levers for actuating it, a rotary and vertically-movable type-wheel mounted on said carriage, of means for rotating the type-wheel when the carriage is thrown by the key-lever, an auxiliary key-lever-actuated mechanism for raising the type-wheel and a second auxiliary key-lever-actuated mechanism for regulating the amount of vertical adjustment of the type-wheel by the first auxiliary key-lever mechanism; the key-lever of the second auxiliary mechanism being in operative relation with the key-lever of the first auxiliary mechanism to impart a further movement to it for the purposes described.

19. The combination with the location-pins and the key-levers operatively connected therewith, of a longitudinally-reciprocating carriage having a longitudinal bar and a transverse bar actuated from the key-levers, a frame-plate overlying the carriage and provided with a plurality of adjustable slides on its under side at opposite sides of said rod and grooved rollers carried by the slides and between which said carriage-rod is guided, a type-wheel on the carriage and a horizontally-movable location-plate mounted on the carriage operatively connected with the type-wheel and having slots for the location-pins.

20. The combination with the type-wheel and its notched centering or locking disk or wheel, of a yoke-like line-gage provided on its base with a centering or locking lug to coöperate with said centering or locking disk.

21. In a type-writer the herein-described line-gage forked to straddle the printing-point and having the upper edges of its arms on the base-line of the printing-plane.

22. In a type-writer the herein-described line-gage formed with an attaching-base, upwardly-extending arms, a central boss and a type-wheel-locking lug of hardened steel secured in said boss.

23. A type-writer comprising the frame or base, the transverse series of vertical location-pins, the key-levers connected therewith, the reciprocating carriage actuated from the key-levers, a frame-plate overlying the carriage, a type-wheel mounted on the rear end of the carriage, a location-plate pivoted to the front end of the carriage, geared at the rear edge to the type-wheel, and provided with a series of individual angular slots for the said location-pins, arms projecting from the frame-plate over the rear portion of the location-plate to hold it down, a vertical slide slidingly connected to the type-wheel, upper and lower transverse adjusting-screws engaging the slide and means for operating the slide.

In testimony whereof I affix my signature in presence of two witnesses.

FRANK H. ARMSTRONG.

Witnesses:
GEO. H. EVANS,
FRANK D. BLACKISTONE.